United States Patent [19]

Watson

[11] Patent Number: 4,479,098
[45] Date of Patent: Oct. 23, 1984

[54] CIRCUIT FOR TRACKING AND MAINTAINING DRIVE OF ACTUATOR/MASS AT RESONANCE

[75] Inventor: William S. Watson, Eau Claire, Wis.

[73] Assignee: Watson Industries, Inc., Eau Claire, Wis.

[21] Appl. No.: 280,500

[22] Filed: Jul. 6, 1981

[51] Int. Cl.³ .......................... H03B 5/30; H03L 7/00
[52] U.S. Cl. .................................... 331/154; 310/318; 318/127; 331/158
[58] Field of Search .................. 331/116 M, 154, 155, 331/156, 157, 158; 318/114, 116, 118, 126, 127, 128; 310/316, 317, 25, 26; 366/116; 74/126, 143; 73/59

[56] References Cited

U.S. PATENT DOCUMENTS

3,967,143  6/1976  Watanabe et al. .................. 318/116
4,177,434  12/1979  Ida ...................................... 331/156
4,240,047  12/1980  Rabinowitz et al. ............... 331/154

Primary Examiner—Siegfried H. Grimm
Attorney, Agent, or Firm—Merchant, Gould, Smith, Edell, Welter & Schmidt

[57] ABSTRACT

A drive circuit (10) for driving an actuator/mass (A) at its natural resonance and for maintaining the instantaneous output signal of the mass at a predetermined constant value over a wide range of dynamically changing resonant frequencies, is disclosed. Current sensing circuitry (C) detects an instantaneous current passing through the actuator/mass (A). A compensation circuit (D) modifies the instantaneous sensed circuit signal to compensate for dynamically changing physical parameters of the actuator mass and for phase irregularities introduced into the sensed signal when the mass oscillates near its natural resonance. Automatic gain control circuitry (E) alters the actuator drive signal to maintain amplitude of the mass oscillation at a predetermined constant value. A drive circuit (B) performs the actual drive function in response to the feedback signal received from the automatic gain control and compensation circuitry.

18 Claims, 5 Drawing Figures

CIRCUIT FOR TRACKING AND MAINTAINING DRIVE OF ACTUATOR/MASS AT RESONANCE

TECHNICAL FIELD

This invention relates generally to an electronic drive circuit, and more specifically to a circuit for driving actuator/mass combinations in optimum and controlled resonance over a wide range of resonant frequencies, particularly for such applications as sensor instrumentation.

BACKGROUND OF THE INVENTION

The instrumentation sensor art has for many years used gyroscopic rate of turn instruments having a spinning gyro. The gyro when forced to turn about an axis perpendicular to its spin axis, exerts a measurable couple force that is portional to the rate of turn being sensed. Such gyro instrumentation is generally expensive due to the precision involved in its design, construction and operation.

More recently, instrumentation sensors have been developed that require no rotating parts, but operate on a principal of vibration of constrained "masses" driven by an actuator. Such vibrating masses may take a number of different configurations such as reed members, piezoelectric bender elements, or electromagnetic members. When used in combination herein, the "mass" and its "actuator" will be referred to collectively as "actuator/mass".

The principle of operation of vibratory mass instrumentation sensors is fairly simple. If a mass is vibrated or maintained in oscillation in a straight line along which it is guided by some constraint, the oscillating mass will not apply any force (other than its own weight) in a direction transverse to the guide as long as the guide maintains a constant orientation in space. However, if the guide is forced to rotate about an axis at right angles to itself, the oscillating member will apply alternating or pulsating forces to the guide member, the average magnitude of which will be proportional to the angular velocity of the forced rotation. Such forces can be measured by such sensors as piezoelectric bender elements. The forces exerted by the oscillating mass on the sensor element causes measurable electrical potential signals to be developed on the faces of the sensor element, which signals can be measured and calibrated to the rate of turn of the sensor instrument.

Figure 1:
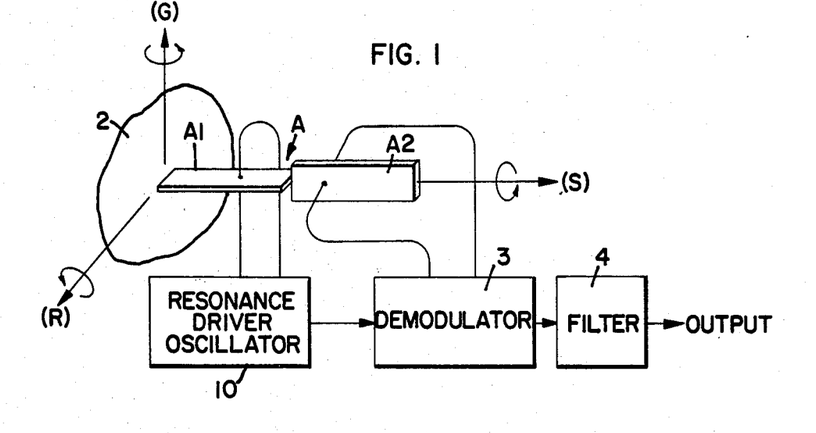
FIG. 1 illustrates, in block diagram form, a practical application of the resonance driver oscillator of this invention, as employed in a piezoelectric vibrating beam angular rate sensor apparatus.

The alternating or pulsating forces from the oscillating mass can also be measured by other techniques known in the art, several of which are discussed in more detail in U.S. Pat. No. 2,544,646 of Barnaby, which is incorporated herein by reference with respect to its applicable discussions of the general art of such vibrating constraint mass instrumentation sensors. Further discussion of background art and description of a vibrating mass sensor system that measures rate of turn about multiple axes, is disclosed in U.S. Pat. No. 3,842,681 to Mumme. Another description of a piezoelectric vibrating beam rate sensor instrument, written by the inventor hereof, which describes a preferred construction of a system suitable for incorporating the resonance drive circuit of this invention, is illustrated in FIG. 1 and is conceptually described in an article entitled "Piezoelectric Vibrating Beam Rate Gyro" published in the *Navy Technical Disclosure Bulletin*, Vol. IV, No. 6 June 1979.

Requisite to all vibrating mass sensor instrumentation systems as described above is a drive circuit for establishing and maintaining the vibrating or oscillatory state of the actuator/mass at an optimum level throughout the operative period of the instrument. Generally, in such instrumentation, it is most desirable to vibrate the actuator/mass at its natural resonance. At any point in time such natural resonance of the actuator/mass will occur at a fixed frequency, known as the resonant frequency of the mass. When the mass is vibrated at its resonant frequency, the mass provides its maximum measurable output signal for use by the instrument's sensor. If the amplitude of the actuator/mass oscillations can be maintained at a constant level throughout the period of operation of the instrument, high measurement accuracy can be maintained indefinitely by the instrument.

The primary deficiency of prior art actuator/mass drive circuits has been their inability to maintain the oscillation drive to the actuator/mass at its natural (or peak) resonance level with changes in the resonant frequency of the actuator/mass during operation. Changes of the resonant frequency are most often caused by such environmental factors as temperature variations to which the actuator/mass is subjected. Since the frequency at which the natural resonance of the actuator/mass occurs can vary considerably with changes in temperature, the oscillatory drive circuit for the actuator/mass must be able to instantaneously track such resonant frequency shifts and to simultaneously drive the actuator/mass at the new resonant frequency level, in order to maintain the output amplitude of the actuator/mass at a constant, maximum level. Failure of the drive circuitry to instantaneously track in real time, the changes in resonant frequency of the actuator/mass, can cause large amplitude variations of the oscillating actuator/mass, resulting in significant instrument output error.

Prior art resonance drive circuits have typically used tuned circuit elements such as oscillators and/or active filters, and are generally tuned to an initial or average resonant frequency of the actuator/mass. With such tuned circuits, however, if the resonant frequency of the driven mass changes due to temperature variations, age, or for other reasons, the tuning circuits must be retuned or the drive circuit physically reconfigured, in order to maintain oscillation of the actuator/mass at its natural (peak) resonance. Such problems associated with tuned circuits are further amplified by manufacturing and component tolerances inherent in the construction of such driver circuits.

Prior art drive circuits have also generally incorporated complex means for sensing the instantaneous resonant frequency and amplitude of the actuator/mass, thus further contributing to circuit complexity and possible source for error and inaccuracy. For example, prior art drive circuits have typically used diodes for envelope detection of the sensed resonance signal and a field-effect transistor to provide the signal limiting function. Both of such devices have temperature and age dependent voltage thresholds which directly contribute to degradation of the driver's ability to precisely maintain the resonance amplitude of the mass over any period of time or over the normal operative temperature range variations. In short, prior art driver circuits have not been of a quality to enable the vibrating mass instrumentation systems to achieve the accuracy or the time/- temperature/age stability of the predecessor gyro/type instrumentation.

The present invention effectively addresses and overcomes most of the above-mentioned deficiencies of prior art actuator mass driver circuits. The driver circuit of this invention does not use any tuned circuits, which allows the driver to maintain resonance of the actuator/mass over a broad range of resonant frequencies, without the need to tune or to reconfigure the drive circuit. Accordingly, manufacturing tolerances and their effect upon the drive circuitry are minimized. The drive circuit of this invention is suitable for driving either piezoelectric or magneto-electromagnetic actuating mechanisms in a resonant system. The driver circuitry incorporates means for controlling output amplitude of the actuator/mass to a high degree of precision. The sensing of resonant frequency and amplitude is provided by the driven actuator mass itself, without the need for any independent or complex sensor circuits to provide feedback signals. This reduces resonant system complexities and eliminates several possible sources of error. The driver circuit of this invention continually energizes the actuator/mass at its natural resonance, even though the resonant system may have significant shifts in its resonant frequency over time, temperature, age or the like.

SUMMARY OF THE INVENTION

The present invention provides an improved technique and apparatus for driving an actuator/mass combination at optimum and accurately controlled resonance in a manner so as to accurately control the amplitude of oscillation of the actuator/mass, over a wide range of dynamically changing resonant frequencies. For most instrumentation systems that employ a driven actuator/mass combination, it is important that the output signal of the actuator/mass be maintained at a predetermined constant value over long time periods, and under significantly varying environmental conditions such as temperature variations, pressure variations and the like. The drive apparatus drives the actuator/mass at its natural resonance so as to maintain the constant value of the actuator/mass output signal, even though the instantaneous frequency at which such natural resonance occurs may vary widely over any particular operative time period of the system. Since the actuator/mass is of a type which produces a voltage when a force is applied to the mass, or conversely produces a force (i.e. motion) when a voltage is applied, the output signal of the actuator/mass has both electrical and physical (i.e. oscillatory motion) components.

According to one embodiment of the invention, the drive apparatus includes sensor means operatively connected with the driven actuator/mass for sensing the actuator output signal and for providing a sensed signal responsive thereto. Compensation circuit means are connected to receive the drive signal applied to the actuator/mass and the sensed signal received from the actuator/mass for removing from the sensed signal variable phase signal components which are inherently introduced into the actuator output signal when the actuator/mass oscillates at a frequency near its natural resonance. The compensation circuit produces a compensated signal having an instantaneous phase that is a function of the simultaneous change of the natural resonant frequency of the actuator/mass and having an amplitude that is a function of the instantaneous amplitude of the oscillatory motion of the actuator/mass.

Automatic gain control circuitry means are connected to receive the compensated signal for providing a feedback signal back to an amplifier drive circuit for driving the actuator/mass in the closed-loop system. The feedback signal has the same phase as the compensated signal, a frequency equal to the instantaneous natural resonant frequency of the actuator/mass and an amplitude sized to identically offset amplitude variations of the compensated sensed signal from a predetermined absolute constant value. The amplifier drive means is connected to directly drive the actuator/mass in response to the feedback signal, and simultaneously provides a drive signal to the compensation circuit means. The closed-loop drive circuit drives the actuator/mass at its instantaneous natural resonant frequency, so as to maintain the magnitude of oscillatory motion of the actuator/mass within predetermined limits of an absolute constant value.

In a preferred construction of the present invention, the actuator/mass comprises a piezoelectric bender element and the compensation circuit includes a piezoelectric bender element member having like physical parameters to that of the actuator bender element, except for its mass. In the preferred embodiment configuration, the compensation circuitry includes a differential amplifier for combining the output signals from the driven actuator/mass, and the driven compensating mass to provide the compensated output signal.

In accordance with the broad scope of this invention, there is provided a drive circuit for use in combination with and for driving an actuator/mass of the type that produces oscillatory motion in response to an impressed voltage, and an output voltage in response to an impressed force. Such actuator/mass combinations are typically used in instrumentation circuitry. The drive circuit has a drive amplifier connected to drive the actuator/mass in response to a feedback signal in a closed loop drive system. The drive amplifier applies a drive voltage directly to the actuator/mass, which induces an oscillatory motion in the actuator/mass, providing the actuator output signal having both physical and electrical parameters. Sensor means are directly connected to receive the actuator output signal, and produces a sensed output signal in response to the actuator output signal. Feedback circuit means complete the closed loop system and are connected to receive the sensed output signal, for modifying the sensed output signal, and for producing the feedback signal therefrom. The feedback signal has phase characteristics suitable for maintaining drive of the actuator mass at its natural resonance, and amplitude characteristics suitable for maintaining the amplitude of the actuator output signal at a constant predetermined level over a broad range of dynamically changing natural resonant frequencies.

While the preferred embodiment of the invention will be described with respect to its use in driving a piezoelectric bender element, it will be noted that other motor/generator types of actuator elements, including electromechanical types of actuator elements can be used within the spirit and broad intent of this invention. Due to the fact that a piezoelectric bender element, displaying capacitive phase properties is being described with respect to the preferred embodiment of the invention, it will be recognized that the compensation circuitry disclosed and other circuits of the closed loop system reflect the capacitive properties of the piezoelectric bender element. The invention is not limited to circuitry that acts upon such capacitive properties, but would also apply to circuits and actuator masses displaying inductive properties. As stated elsewhere herein, it will also be appreciated that while the compensation circuitry described in the preferred embodiment includes a second actuator/mass having physical properties virtually identical to that of the primary actuator/mass, other compensation circuitry could be employed to achieve the desired phase modification results. Similarly, while a complimentary driver circuit has been employed in the preferred embodiment construction of the invention, other appropriate drive circuitry could equally well be used within the spirit and intent of this invention. These and other modifications of the invention will become apparent to those skilled in the art, in light of the following description of a preferred embodiment of this invention.

DESCRIPTION OF THE PREFERRED EMBODIMENT

Figure 2:
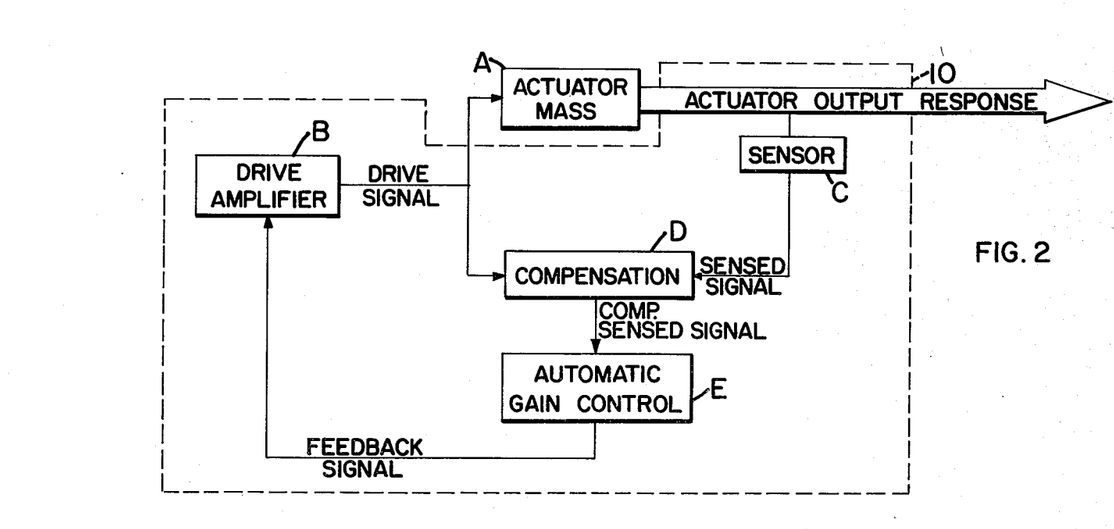
FIG. 2 illustrates a functional block diagram of a system for performing the functions of the resonance drive oscillator portion of the apparatus illustrated in FIG. 1.

Referring to the Drawing, wherein like numerals represent like parts throughout the several views, a functional block diagram of a drive system for a actuator/mass, that operates according to the principals of this invention is generally illustrated at 10 in FIG. 2. Referring thereto, the primary actuator/mass that is to be driven, and whose output response to be accurately controlled is generally illustrated at (A). As will become apparent from a more detailed description of the invention, while the actuator/mass (A) forms a very integral part of an instrumentation system and the closed-loop drive system, the actual drive circuitry of the invention can be constructed for driving a number of different types of actuator/masses. Accordingly, the actuator/mass (A) has not been illustrated as included within the functional drive circuitry block 10. The actuator/mass is of the type particularly referred to as a "motor/generator" type of actuator, in that the actuator responds to a force applied to the mass, to produce a voltage, and responds to a voltage applied to the mass by producing an oscillatory motion of the physical mass. The actuator/mass may comprise a number of different types of such actuators. While the preferred embodiment of the invention will be described in relation to a piezoelectric actuator (i.e. a bender element member), the drive apparatus and circuitry of the invention applies equally well to magneto-electromagnetic actuators. Further, while the preferred embodiment of the invention will be described with respect to a linear vibratory system, it will be understood that the invention would equally well apply to the activation of torsional vibratory systems.

Referring to FIG. 2, the actuator mass (A) is actuated by a Drive Signal from a drive amplifier (B). The Drive Signal is in the preferred embodiment, in the form of an electrical voltage signal that is impressed upon or applied to the actuator/mass (A). The actuator/mass (A) responds to the applied Drive Signal by producing an Actuator Output Response signal having both physical oscillatory movement and electrical voltage components. As will be better understood from a more detailed description of the invention, the actuator/mass (A) has a "natural resonance" property wherein at any instant of time, the physical Actuator Output Response Signal from the actuator/mass (A) will have a maximum oscillatory movement at one particular frequency of activation by the Drive Signal. That particular instantaneous frequency is referred to as the natural resonant frequency for the actuator/mass (A). That resonant frequency will change with changes in physical parameters (such as temperatures, pressure, etc.) to which the actuator/mass (A) is subjected.

The electrical portion of the Actuator Output Response Signal is sensed by means of a sensor network (C) that produces a Sensed Output Signal in response thereto. The Sensed Output Signal is directed to a compensation functional block, generally designated at (D). The compensation block also receives the Drive Signal from the drive amplifier (B). The compensation functional block compares the primary Drive Signal with the Sensed Output Signal and modifies the Sensed Output Signal as a result of such comparison, to produce a Compensated Sensed Output Signal. The Compensated Sensed Output Signal is further modified by means of an automatic gain control functional block (E). The automatic gain control network (E) modifies the amplitude portions of the Compensated Sensed Output Signal; whereas the compensation functional block (D) modifies the phase parameters of the Sensed Output Signal. The output signal from the automatic gain control functional block (E) is a Feedback Signal having precise amplitude, phase and frequency parameters for driving the actuator mass at any point in time so as to maintain the drive of the actuator/mass (A) at its natural resonance, regardless of the particular frequency on which such natural resonance may occur at any particular point in time, or in response to any particular environmental parameters. The drive amplifier (B) provides the appropriate circuitry for applying the Feedback Signal in "drive" form to the actuator/mass (A).

Figure 3:
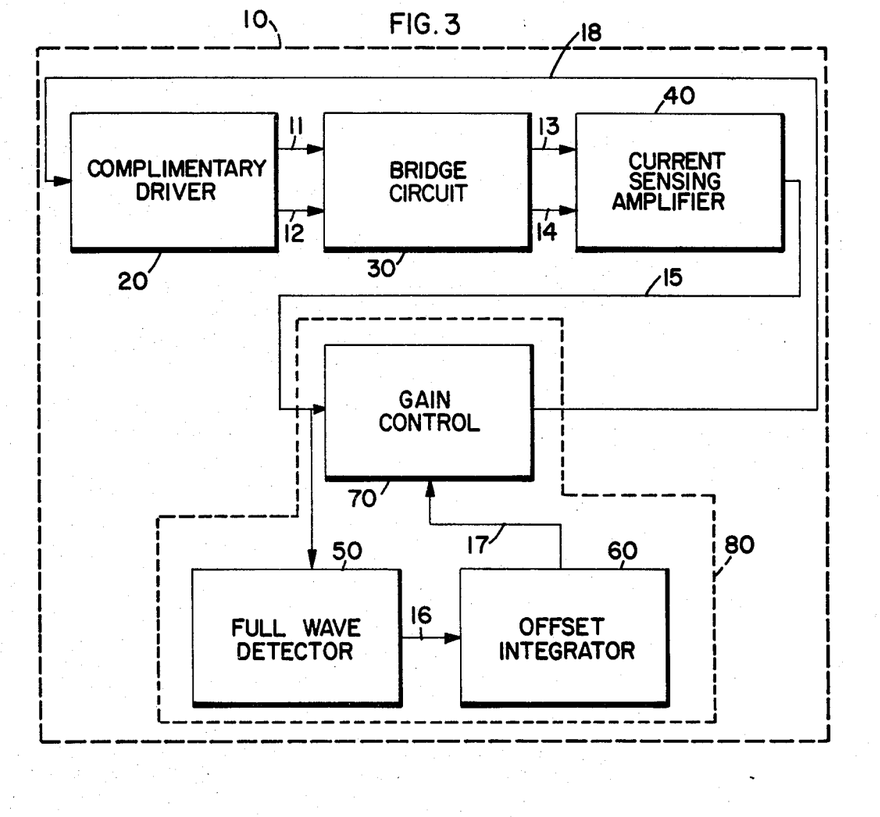
FIG. 3 is a block diagram illustrating a circuit configuration for implementing the resonance drive oscillator illustrated in FIG. 2.

A more detailed circuit functional block diagram of the resonance driver apparatus functionally discussed above, is illustrated in FIG. 3. Referring thereto, resonance drive circuit 10 comprises the circuit blocks illustrated within the dashed line. The resonance drive circuit 10 has, in the preferred embodiment construction, a complimentary drive circuit generally designated at 20, having a pair of output terminals connected by signal flow paths 11 and 12 to a bridge circuit 30. As will be discussed in more detail hereinafter, the bridge circuit functional block 30 actually includes as a part thereof, the actuator/mass (A) that is to be driven in controlled resonance. A pair of output signals from the bridge network 30 are carried by means of signal flow paths 13 and 14 to a current sensing amplifier network 40. The output signal from the current sensing amplifier 40 is provided by means of a signal flow path 15 as an input signal to a full wave detector network 50, and as a first input signal to a gain control network 70. The output signal from the full wave detector network 50 is carried by means of a signal flow path 16 to an offset integrator network 60, having an output terminal whose signal is carried by means of a signal flow path 17 to a second signal input of the gain control network 70. The output signal from the gain control functional block 70 is carried by means of a feedback signal flow path 18 to the signal input terminal of the complimentary driver network 20. As will become apparent from a more detailed discussion of the invention, the full wave detector (50), the offset integrator (60) and the gain control (70) networks collectively combine to form an automatic gain control function, schematically illustrated within the dashed line 80 in FIG. 2.

Figure 4:
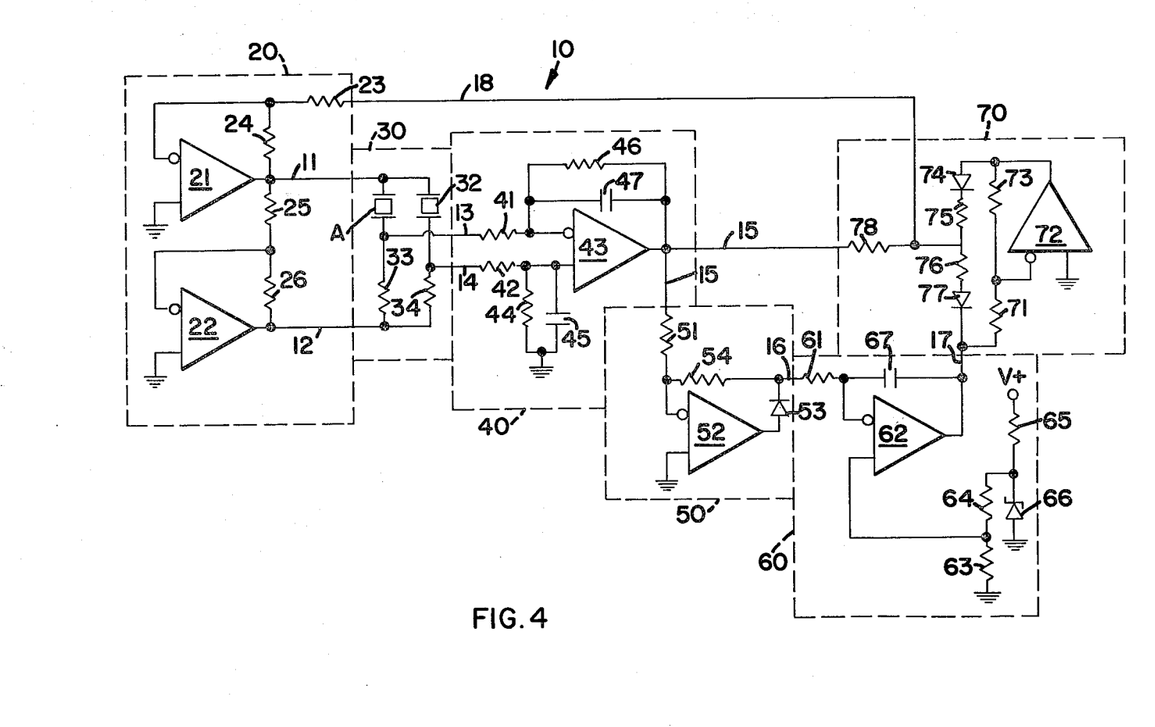
FIG. 4 is a schematic diagram of the resonance driver oscillator circuit of FIG. 3.

The resonance drive oscillator circuit 10 of the preferred embodiment is schematically illustrated in more detail in FIG. 4. Referring thereto, it will be noted that a number of operational amplifiers are illustrated. For simplicity and ease in describing the circuit, the ground or reference terminals, the positive and negative power supply terminals and the frequency compensation terminals for the operational amplifiers are not illustrated. It will be understood, however, that such terminals are appropriately connected to the operational amplifiers in a manner well known to those skilled in the art. In the preferred embodiment circuit illustrated, the positive and negative power supply terminals for the operational amplifiers are respectively connected to +15 volt and −15 volt power source voltages. Other connections to the reference or ground terminal or to the respective positive or negative power supply voltages will be merely described by the standard "reference" symbol or by "V+" (for the positive voltage supply) and by "V−" (for the negative voltage supply).

Referring to FIG. 4, the complimentary driver circuit 20 includes a pair of operational amplifiers 21 and 22 connected in complimentary drive manner. The operational amplifier 21 has an inverting input terminal connected to receive a feedback signal from the signal flow path 18 through a resistor 23. The non-inverting input terminal of the operational amplifier 21 is connected to the reference potential for the system. The output terminal of the operational amplifier 21 is connected to its inverting input by means of a resistor 24, and is connected to the inverting input of operational amplifier 22 by means of a resistor 25. The output terminal of operational amplifier 21 is also directly connected to the signal flow path 11.

The non-inverting input terminal of the operational amplifier 22 is directly connected to the system reference potential. The output terminal of operational amplifier 22 is connected by means of a resistor 26 to its inverting input. The output terminal of operational amplifier 22 is directly connected to the signal flow path 12.

The signal flow paths 11 and 12 carry complimentary drive voltage signals for driving the actuator/mass (A) whose resonance is to be controlled and maintained at a maximum for the particular application in which the resonance drive oscillator circuit 10 is used. In the preferred embodiment, the actuator/mass being driven is a piezoelectric bender element, and more particularly a piezoceramic element, and is generally illustrated in FIG. 4 as a portion of the bridge circuit 30. It will be understood that while a piezoelectric actuator/mass element is illustrated as being driven in the preferred embodiment illustration, that such driven element could equally well be a magneto-electromagnetic device (as for example is described in U.S. Pat. No. 2,554,646 to Barnaby et al). In the preferred application of the resonance drive oscillator circuit for driving the piezoelectric bender element (A), the conductors illustrated as being connected to the bender element (A) are physically and electrically connected to the opposing surfaces of the thin bender element member by soldering the conductors directly to the opposing piezoelectric bender element faces. Accordingly, the complimentary voltage drive signals carried by the signal flow paths 11 and 12 will physically activate and move (i.e. "drive") the piezoelectric bender element (A). Referring to FIG. 4, it will be noted that the signal flow path 11 is directly connected to a first surface of the piezoelectric bender element (A), and that the signal carried by signal flow path 12 is applied to the second surface of the piezoelectric bender element (A) through a resistor 33. As previously discussed, the first and second "surfaces" of the piezoelectric bender element (A) are generally oppositely disposed planar surfaces of the thin and elongate piezoelectric bender element.

The bridge network 30 further includes a compensating member, generally illustrated at 32. The compensating member 32 is primarily configured for temperature compensation, as will be fully discussed in more detail hereinafter, and can comprise any appropriate structural member or circuit for modeling the parameters of the primary actuator/member (A), that are to be compensated or controlled. In the preferred embodiment, the compensating member 32 comprises a piezoelectric bender element, and in particular a piezoceramic member selected from the same manufacturing batch and having the same general physical and electrical characteristics (except for mass) as the primary actuator/member (A). Since the primary actuator/member (A) in the preferred embodiment is a piezoelectric device, the compensating member 32 could alternatively be any appropriate "capacitance"-type circuit that would display comparable capacitive changes with temperature variations, to those of the primary actuator member (A). Alternatively, if the primary actuator member (A) were an magneto-electromechanical device, the compensating member 32 would be selected for its "inductive" compensation properties.

In the preferred embodiment construction, the output signal from the operational amplifier 21 is directly applied by means of the signal flow path 11 to a first side of the piezoelectric compensating bender element 32, and the output signal from the operational amplifier 22 is applied by means of the signal flow path 12 and a resistor 34 to a second side (oppositely disposed from the first side) of the compensating bender element 32.

The second side of the primary actuator bender element (A) is connected by means of the signal flow path 13 and a resistor 41 to an inverting input of an operational amplifier 43 within the current sensing amplifier 40. The second side of the compensating bender element 32 is connected by means of the signal flow path 14 and a resistor 42 to the non-inverting input of the operational amplifier 43. The non-inverting input of the operational amplifier 43 is connected by a resistor 44 and a capacitor 45 connected in parallel, to the system reference potential. The output signal from the operation amplifier 43 is fed back through the parallel combination of a resistor 43 and a capacitor 47 to its inverting input terminal. The output terminal of operational amplifier is also directly connected to the signal flow path 15.

The signal flow path 15 carries the input signal for the automatic gain control functional circuits, which include the full wave detector network 50, the offset integrator network 60 and the gain control network 70. The output terminal of operational amplifier 43 is connected by means of the signal flow path 15 and a resistor 51 to the inverting input of an operational amplifier 52 within the full wave detector network 50. The non-inverting input terminal of the operational amplifier 52 is directly connected to the system reference potential. The output terminal of the operational amplifier 52 is connected by means of a diode 53 in series with a feedback resistor 54, to its inverting input. The cathode of the diode 53 is connected to the signal flow path 16, which carries the output signal from the full wave detector network 50.

The signal flow path 16 is connected by means of a resistor 61 to the inverting input terminal of an operational amplifier 62. The non-inverting input terminal of the operational amplifier 62 is connected by means of a resistor 63 to the system reference potential and by means of resistors 64 and 65 connected in series, to the positive voltage source (V+) for the system. In the preferred embodiment application of the resonance drive oscillator circuit 10, the positive voltage source level (V+) is +15 volts D.C. The junction between resistors 64 and 65 is connected by means of a zener diode 66 to the system reference potential. The zener diode 66 clamps the junction between resistors 64 and 65, in the preferred embodiment, to a 5.1 volt level. The output terminal the operational amplifier 62 is connected by means of an integrating feedback capacitor 67 to its inverting input terminal.

The output terminal of the operational amplifier 62 is also connected by means of the signal flow path 17 and a resistor 71 to the inverting input terminal of an operational amplifier 72 within the gain control network 70. The non-inverting input terminal of the operational amplifier 72 is directly connected to the system reference potential. The output terminal of the operational amplifier 72 is connected by means of a feedback resistor 73 to its inverting input terminal. The output signal from the operational amplifier 72 is also applied by means of a diode 74 in series with a resistor 75 to the feedback signal flow path 18. The output terminal of operational amplifier 72 is further connected by the diode 74 and resistor 75, and the series connection of a resistor 76, a diode 77 and the resistor 71 to the inverting input of the amplifier 72. The signal flow path 17 connectes in circuit with the cathode of the diode 77. The signal flow path 15 carries the output signal from the operational amplifier 43 of the current sensing amplifier 40 through a resistor 78 to the feedback signal flow path 18. The feedback signal flow path 18 is, therefore, connected to the junction of resistors 75, 76 and 78, and carries the feedback signal from the automatic gain control functional block 80 to the input terminal of the complimentary drive circuit.

The operational amplifiers of the resonance drive oscillator circuit 10 can be any well-known type in the art such as type 741 or LM324 amplifiers. The values of the various components for a preferred construction on the resonance drive oscillator circuit for driving the piezoelectric primary actuator/member 31 are illustrated in Table I herein.

TABLE I

| Component | Value |
|---|---|
| R24, 25, 26, 71, 73 | 100 kohm |
| R23 | 27 kohm |
| R33, 34 | 1 kohm |
| R41, 42, 51, 54, 78, 76, 75 | 10 kohm |
| R44, 46, 61 | 1 Megohm |
| R65 | 20 kohm |
| R64 | 6.8 kohm |
| R63 | 15 kohm |
| C45, 47 | 100 picofarad |
| C67 | 0.047 microfarad |
| D66 | 5.1v Zener diode |
| D53, 74, 77 | 1N 4148 switching diode |
| Op. Amp. 21, 22, 43, 52, 62, 72 | type LM 324 |
| Bender Elements (A), 32 | Piezoceramic bender elements (A) - approximately 0.1 g. mass; 32 = approximately 0.2 g. mass. |

It will be understood that the values of such components used in the preferred embodiment configuration of the circuit are illustrative only, of a specific circuit embodiment that is constructed according to the principles of this invention, and that this invention is not in any way limited to such values or even to the use of the particular circuit configurations illustrated. This invention is to be limited only by the broad scope of the appended claims.

When comparing the functional block diagram illustration of FIG. 2 with that of the schematic circuitry of FIG. 4, the drive amplifier (B) corresponds to the complimentary drive amplifier circuit 20. The sensor functional block (C) finds representation in the current sensing resistors 33 and 34 within the bridge circuit 30, and related physical connections to the actuator/mass (A) and the compensator element 32. The compensation functional block (D) includes the compensator element 32 as well as the current sensing amplifier circuit 40. The functional automatic gain control block (E) is represented by the full wave detector 50, the offset integrator 60 and the gain control 70 networks illustrated in FIG. 4. The Feedback Signal is applied by means of the signal flow path 18, and the Compensated Sensed Output Signal is carried by signal flow path 15. The Sensed Signal is carried by signal flow path 13, and the Drive Signal is carried by signal flow paths 11 and 12.

Figure 5:
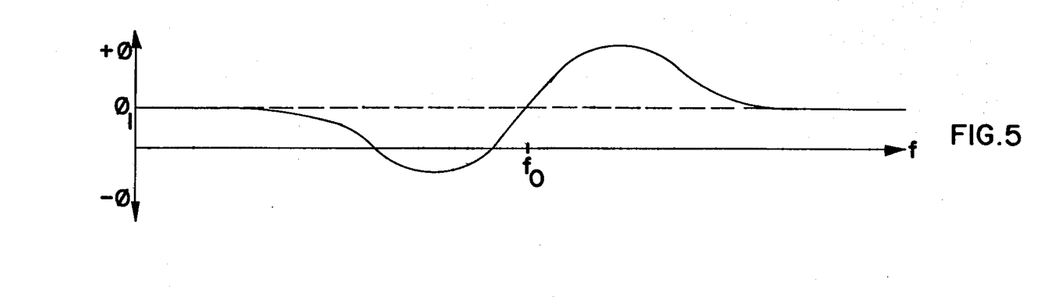
FIG. 5 is a diagram illustrating the phase relationship existing between the drive voltage and current signals of a driven actuator mass that is typically used in an instrumentation system as illustrated in FIGS. 1 through 4.

The complimentary drive network 20 is directly connected to drive both the actuator/mass (A) as well as the compensating element 32. The direct connection of the complimentary output of the driver 20 to the bender elements (A) and 32 provides for significantly increased drive signals to the bender elements, as compared to using a simplex high voltage amplifier or a step-up transformer, as have commonly been used in the prior art. Use of the complimentary drive capability of the driver 20 is enabled in the preferred embodiment by the combination of the Bridge circuit 30 and current sensing amplifier 40 networks, due to their enhancement of differential input signals and the rejection of common mode input signals. Voltage signals applied by the complimentary driver 20 to the actuator/mass (A) and the compensating bender element 32 by means of the signal flow path 11 and 12, induce a reactive physical oscillatory motion in the bender elements, which motion forms a portion of the Actuator Output Response Signal of the bender elements (see FIG. 2). The Actuator Output Response Signal from the actuator/mass (A) and the compensating element 32 also contains an electrical signal component, causing current flow through the bridge resistors 33 and 34 and respectively through the input resistors 41 and 42 of the differential amplifier 43. The current flowing through the current sensing resistor 33 is a measure of the Actuator Output Response Signal from the actuator/mass (A), while the current flowing through current sensing resistors 34 provides a comparison signal of what the current flow through the actuator/mass (A) would look like if the actuator/mass (A) were not operating at its natural resonance. This principle can be better understood with reference to FIG. 5. FIG. 5 illustrates the phase relationship that exists between the drive voltage and the current flow through a piezoelectric bender element actuator/member. The frequency of oscillation of the actuator/mass is plotted on the horizontal axis, and the phase difference between the drive voltage and the current flow through the element is plotted on the vertical axis. The designation "$f_o$" designates the frequency at which natural resonance occurs for the actuator/mass. The "$f_o$" point is often referred to as the natural resonant frequency of the bender element. The natural resonant frequency of the bender element will vary in response to a number of physical parameters such as temperature of the element, pressure, aging of the bender element, and the like. Referring to FIG. 5, it will be noted that when the actuator/mass is driven at a frequency substantially removed from the resonant frequency (i.e. "$f_o$"), there is virtually a constant phase shift of "$\phi_1$" between the drive voltage and the current through the element. It will be noted, however, that the phase difference between the drive voltage and the bender element current significantly changes as the frequency approaches the resonant frequency of the bender element. Such difference in the phase response of the bender element near resonance is caused by the electrical signal generated in the actuator/mass by the physical resonance of the bender element.

Referring to FIG. 4, while the physical material properties of the actuator/mass (A) and of the compensation element 32 are identical, their respective masses are significantly different such that natural resonance of the two crystals occurs at significantly different frequencies. Therefore, when the primary actuator/mass (A) is driven at or near its natural resonance, the compensation element is being driven at a frequency significantly removed from its natural resonant frequency such that the phase offset between its driving voltage and the compensation element current is virtually constant at the "$\phi_1$" level (see FIG. 5). The sensed current signals from the primary actuator/mass (A) and the compensation mass 32 are respectively applied to the non-inverting and inverting input terminals of the differential amplifier 43, effectively substracting the non-resonant signal from the resonant signal, to eliminate the phase offset between the drive voltage and current of the sensed actuator current signal at resonance. The resultant signal appearing at the output terminal of the differential amplifier 43 and carried by signal flow path 15 is what has been referred to in FIG. 2 as the Compensated Sensed Output Signal. In short, the current sensing amplifier 40 functions as a high gain differential amplifier to substract the compensation signal from the resonant actuator signal. The small-valued capacitors 45 and 47 of the current sensing amplifier 40 provide frequency compensation for limiting the upper frequency response of the amplifier. Since the phase characteristics of the Compensated Sensed Output Singal from the differential amplifier 43 are not altered in the feedback signal carried by signal flow path 18 to the complimentary driver 20, the direction of the phase shift in the Compensated Sensed Signal that is generated when the operative frequency is removed from resonance is such that when the feedback signal is fed back into the complimentary driver 20, the driver tends to drive the actuator mass (A) back to natural resonance at its instantaneous resonant frequency.

Therefore, the current sensing amplifier 40 extracts from the sensed current signal the value of the actuator/mass current that is caused by the mechanical resonant operation of the actuator bender element. In the preferred embodiment, this process is most simply accomplished by use of the compensating bender element 32. However, it will be understood that an equivalent function could be performed by appropriate compensation circuitry that accurately models the physical parameters of the actuator/mass (A). Further, it will be understood that while a piezoelectric bender element, having capacitance characteristics, has been used in the preferred embodiment, the principles of the invention apply equally well to other types of actuator/mass structures, such as those having inductive characteristics.

The Compensated Sensed Output Signal is supplied by means of the signal flow path 15 to the full wave detector network 50. Referring to FIG. 4, all positive signals applied to the full wave detector 50 pass directly through the resistors 51 and 54 to the signal flow path 16, since the diode 53 prevents the amplifier 52 from modifying the positive signals. Negative signals apply to the inverting input of the amplifier 52 are produced as positive output signals at the signal flow path 16, identical in magnitude to the input signals applied to the amplifier 52. It will be noted that since the magnitude of the output voltage of the amplifier 52 is determined by the feedback resistor 54, the amplitude is not affected by the forward bias voltage of the diode 53.

The offset integrator network 60 acts as a conventional integrator circuit, with the exception that a precision bias voltage is placed by the zener diode and resistors (i.e. 66, 65, 64 and 63) on the non-inverting input of the amplifier 62. Therefore, when the average input voltage applied by the signal flow path 16 to the inverting input of the amplifier 62 equals the bias voltage of the non-inverting input, there will be no net change in the output voltage of the amplifier 62 over the particular integrating interval (regardless of the value of the specific output voltage). However, any variation of the average input voltage applied to the inverting input terminal of the amplifier 62, from the bias voltage applied to the non-inverting input of the amplifier 62 will cause a proportionate voltage "rate" at the output of the amplifier 62, which is in turn applied to the signal flow path 17. The effect of the offset integrator network 60 operation is that the output signal carried by signal flow path 17 automatically compensates for any voltage biases present in the gain control circuitry 80, since the integrator continually adjusts the output voltage until the proper integrator input level is achieved.

The gain control network 70 softly clamps the output signal from the offset integrator network 60, symmetrically, at a level controlled by the input from the offset integrator network 60, thereby reducing the feedback current signal, when driven by the output of the offset integrator 60, to control the system loop gain.

The resultant feedback signal applied by the signal flow path 18 to the complimentary driver 20 drives the primary actuator/mass (A) at its instantaneous natural resonant frequency so as to maintain the magnitude of the oscillatory motion of the actuator/mass (A) within predetermined limits of an absolute constant value. Such a closed-loop system allows the driver network 10 to drive the actuator/mass (A) at its natural resonance over a broad range of resonant frequencies, without any requirements for tuning or reconfiguring the drive circuitry. This feature of the invention becomes particularly important when dealing with manufacturing tolerances of the driver circuit and of the instrumentation systems which would employ this invention. Further, with the current sensing configuration of the present invention, sensing of the resonant frequency and resonance amplitude is directly provided by the primary actuator (A) itself, without the need for any independent sensors which might incorporate independent feedback loops. The direct incorporation of the actuator/mass within the sensing function significantly reduces circuit complexities and eliminates several possible sources of error in the sensing operation.

The drive circuit of the present invention, natural resonance is provided even though the resonant system may have significant shifts in resonant frequency over time, temperature and the like. Once the loop gain is set for the particular type of actuator/mass to be driven, the drive circuit automatically maintains driving of the actuator/mass at its natural resonance. For example, with the preferred embodiment configuration of the drive circuit, which uses a piezoelectric bender element, drive of the bender element can be maintained at its natural resonance from frequencies as low as 0.1 hz up to 250 hz. With simple modifications to the frequency ranges of the circuitry, the range could further be extended into the kilohertz and even into the megahertz ranges—all without requiring returning or reconfiguration of the drive circuitry, once the loop gain is set. Operation of the drive circuitry is self-starting. The noise to which the actuator/mass is exposed initiates a drive signal that is fed back through the closed-loop system and is appropriately amplified thereby, until the actuator/mass becomes operative at its natural resonance, at which point the driver circuitry will automatically maintain subsequent drive of the bender element at its natural resonance level.

FIG. 1 illustrates a typical instrumentation system application for a drive circuit as described by this invention. The instrumentation network illustrated in FIG. 1 is identical to that proposed by the inventor hereof in the previously discussed Navy Technical Disclosure Bulletin, and is merely being referred to herein to illustrate a typical application of the present invention. In the FIG. 1 instrumentation system, the actuator/mass (A) comprises the combination of a first piezoelectric bender element (A1) fastened at one end to a base plate 2 and at its other end to a second piezoelectric bender element (A2) oriented at a 90 degree rotation about the longitudinal or sensed axis (S). The resonance driver oscillator 10 of this invention drives the assembled actuator/mass beam (A) at its natural resonance about the rotor axis (R) which is perpendicular to the sensed axis (S). When the instrumentation system incorporating the actuator mass beam (A) is subjected to a physical rotation force applied about the sensed axis (S), the second piezoelectric bender element (A2) will oscillate in deflections about the gimbal axis (G), which is perpendicular to both the sensed axis (S) and the rotor axis (R). The resultant deflections of the second piezoelectric bender element (A2) about the gimbal axis (G) produce an electrical signal across the second piezoelectric bender element (A2) which is proportional to the oscillatory deflection.

The signal generated by the second piezoelectric bender element (A2) is demodulated by an appropriate demodulator circuit 3, using the resonance oscillator signal as a phase reference, and is filtered by means of an appropriate filter network 4, to remove all drive frequency components from the demodulated signal. The resultant output signal is a smooth analog representation of the rotation rate of the instrumentation system about the sense axis (S).

From the foregoing description, it will be appreciated that the present invention solves many of the problems or deficiencies associated with prior art actuator mass drive configurations. It will be understood that while a specific application for the present invention, as used in association with driving a piezoelectric crystal for an instrumentation system has been disclosed, the invention is also applicable to the driving of other actuator/mass configurations for use in other types of systems. Further, while specific circuit components and arrangements have been used in association with describing the details of the preferred embodiment of the invention, it will be understood that many other variations of such circuitry are possible within the spirit and broad scope of this invention. Other modifications of the invention will be apparent to those skilled in the art in light of the foregoing description. This description is intended to provide a specific example of an individual embodiment which clearly discloses the present invention. Accordingly, the invention is not limited to the described embodiment, or to the use of specific elements therein. All alternative modifications and variations of the present invention which fall within the spirit and broad scope of the appended claims are covered.

What is claimed is:

1. Drive circuit apparatus for driving an actuator/mass at its natural resonance to maintain the instantaneous output signal of the actuator/mass at a predetermined constant value over a wide range of dynamically changing resonant frequencies, comprising:

(a) an actuator/mass having a mass suitably mounted for oscillatory motion in response to activation by an impressed drive signal, said actuator/mass producing an oscillatory actuator output signal having parameters related to both the drive signal and the resonance of said actuator/mass;

(b) sense means operatively connected to said actuator/mass for directly sensing said actuator output signal and for providing a sensed signal in response thereto;

(c) compensation circuit means connected to receive said drive signal and said sensed signal for removing from said sensed signal those said parameters related to the drive signal, thereby leaving those parameters related only to the resonance of said actuator/mass, and for producing a compensated sensed signal responsive thereto; wherein the phase of said compensated sensed signal is a function of the simultaneous change in the natural resonant frequency of the actuator/mass, and wherein the amplitude of said compensated sensed signal is a function of the instantaneous amplitude of oscillatory motion of the actuator/mass;

(d) automatic gain control means operatively connected to receive said compensated sensed signal for providing in response thereto a feedback signal having the same phase as said compensated sensed signal, having frequency equal to the natural resonant frequency of the actuator/mass and having an amplitude proportional to the difference in amplitude of said compensated sensed signal from a predetermined absolute constant value; and (e) amplifier drive means operatively connected with said automatic gain control means, with said actuator/mass and with said compensation circuit means for producing said drive signal in response to said feedback signal for driving said actuator/mass and said compensation circuit means; whereby said actuator/mass is driven at its instantaneous natural resonant frequency so as to maintain the amplitude of oscillatory motion of the actuator/mass within predetermined limits of said absolute contant value.

2. Drive circuit apparatus as recited in claim 1, wherein said compensation circuit means comprises:

(a) a compensation actuator/mass of like configuration and material as said actuator/mass, but having significantly different resonance from that of said actuator/mass, said compensation actuator/mass being connected to receive said drive signal and producing an oscillatory compensation output signal in response to said drive signal; and (b) signal processing means operatively connected to receive said sensed signal and said compensation output signal for producing in response thereto said compensated sensed signal.

3. Drive circuit apparatus as recited in claim 2, wherein said signal processing means includes an amplifier circuit for combining said sensed signal and said compensation output signal.

4. Drive circuit apparatus as recited in claim 3, wherein said amplifier circuit comprises a differential amplifier.

5. Drive circuit apparatus as recited in claim 4, wherein said actuator/mass and said compensation actuator/mass include piezoelectric blender elements, and wherein said differential amplifier subtracts said compensation output signal from said actuator output signal.

6. Drive circuit apparatus as recited in claim 2, wherein said actuator/mass and said compensation actuator/mass include piezoelectric bender elements.

7. Drive circuit apparatus as recited in claim 1, wherein said actuator/mass includes a piezoelectric blender element.

8. Drive circuit apparatus as recited in claim 1, wherein said actuator/mass comprises a piezoelectric bender element, and wherein said amplifier drive means comprises a complimentary amplifier circuit.

9. Drive circuit apparatus as recited in claim 1, wherein said automatic gain control means comprises:

(a) voltage reference circuit means for providing a constant voltage reference signal;

(b) detector circuit means operatively connected to receive said compensated sensed signal for producing a detected output signal having a voltage level proportional to the peak value of said actuator output signal;

(c) integrator circuit means operatively connected to receive said voltage reference signal and said detected output signal for providing an integrated output signal proportional to the integral of the difference of said detected output signal and said reference voltage signal; and (d) a gain control circuit operatively connected to receive said integrated output signal for varying the amplitude of said compensated sensed signal in response thereto, thereby controlling the system loop gain; whereby the varied compensated sensed signal comprises said feedback signal.

10. Drive circuit apparatus as recited in claim 1, wherein said compensation circuit means comprises:

(a) a circuit model being connected to receive and being driven by said drive signal and having electrical parameters matched to those of said actuator/mass when driven by said drive signal, but having negligible resonance with respect to that of said actuator/mass, said circuit model being operative to produce an oscillatory compensation output signal in response to said drive signal; and (b) signal processing means operatively connected to receive said sensed signal and said compensation output signal for producing in response thereto said compensated sensed signal.

11. The combination with an actuator/mass of the type that produces oscillatory motion in response to an impressed voltage and an output voltage in response to an impressed force, of a drive circuit comprising:

(a) drive amplifier means for directly driving the actuator/mass by applying a drive voltage to the actuator/mass in response to a feedback signal, whereby the actuator mass produces an actuator output signal having both physical and electrical parameters;

(b) sensor means connected to directly sense said actuator output signal for producing a sensed output signal in response thereto;

(c) feedback circuit means operatively connected to receive said sensed output signal for producing said feedback signal in response thereto; wherein said feedback signal has phase parameters suitable for maintaining drive of the actuator/mass at its natural resonance, and amplitude parameters suitable for maintaining the amplitude of said actuator output signal at a constant predetermined level over a broad range of dynamically changing natural resonant frequencies; said feedback circuit means including compensation circuit means connected to receive said sensed output signal for altering the phase characteristics of said sensed output signal to respond to dynamically changing physical properties of said actuator/mass, wherein said compensation circuit means comprises:

(i) a compensation actuator/mass operatively connected to receive said drive voltage and having electrical properties except for resonance similar to those of said actuator/mass; and (ii) comparator means for comparing the responses of said actuator/mass and said compensation actuator/mass when energized by said drive voltage, for producing said altered sensed signal in response thereto; and (d) means operatively connecting said feedback circuit means with said drive amplifier means, for applying said feedback signal to said drive amplifier means; whereby a closed-loop drive circuit is established.

12. The apparatus as recited in claim 11, wherein said sensor means includes a current detector operatively connected with said actuator/mass for detecting the current flow signal through said actuator means.

13. The apparatus as recited in claim 11, wherein said feedback circuit means includes automatic gain control means connected to receive said sensed output signal and for altering the amplitude of said sensed output signal to identically offset the amplitude variations of the sensed output signal from a predetermined absolute constant value.

14. The combination with an actuator/mass of the type that produces oscillatory motion in response to an impressed voltage and an output voltage in response to an impressed force, of a drive circuit comprising:
(a) drive amplifier means for directly driving the actuator/mass by applying a drive voltage to the actuator/mass in response to a feedback signal, whereby the actuator/mass produces an actuator output signal having both physical and electrical parameters;
(b) sensor means connected to directly sense said actuator output signal for producing a sensed output signal in response thereto;
(c) feedback circuit means operatively connected to receive said sensed output signal for producing said feedback signal in response thereto; wherein said feedback signal has phase parameters suitable for maintaining drive of the actuator/mass at its natural resonance, and amplitude parameters suitable for maintaining the amplitude of said actuator output signal at a constant predetermined level over a broad range of dynamically changing natural resonant frequencies; wherein said feedback circuit means includes compensation circuit means and automatic gain control means for respectively altering the phase and amplitude parameters of said sensed output signal in response to the dynamically changing phase and amplitude parameters respectively of said actuator/mass; and wherein said automatic gain control means comprises:
  (i) voltage reference circuit means for providing a constant voltage reference signal;
  (ii) detector circuit means operatively connected to receive said phase altered sensed output signal for producing a detected output signal having a voltage level proportional to the peak value of said actuator output signal;
  (iii) integrator circuit means operatively connected to receive said voltage reference signal and said detected output signal for providing an integrated output signal proportional to the integral of the difference of said detected output signal and said reference voltage; and
  (iv) a gain control circuit operatively connected to receive said integrated output signal for varying the amplitude of said phase altered sensed signal in response thereto, thereby controlling the system loop gain; whereby the phase altered and amplitude varied sensed signal comprises the feedback signal.

15. The apparatus as recited in claim 14, wherein the voltage reference circuit means includes a zener diode circuit for establishing said constant voltage reference signal.

16. An actuator/mass drive circuit for continuously driving an actuator/mass having dynamically changing resonance, at its resonant frequency so as to maintain a constant amplitude signal therefrom, comprising:
(a) a drive circuit responsive to a feedback signal for producing a drive signal to drive said actuator/mass at its natural resonance, wherein said driven actuator/mass produces an oscillatory actuator output signal including parameters related to both drive signal and the resonance of said actuator/mass;
(b) feedback circuit means connected to receive said actuator output signal and being responsive thereto for producing said feedback signal, said feedback circuit means including compensation circuit means for removing from said actuator output signal those said parameters related to said drive signal thereby leaving only those parameters relating to the resonance of said actuator/mass; wherein said feedback signal has phase parameters suitable for maintaining stable drive of said actuator/mass at its natural resonance, and amplitude parameters suitable for maintaining the amplitude of said actuator output signal at a constant predetermined level over a broad range of dynamically changing natural resonant frequencies; wherein said feedback circuit means does not include or depend on any oscillator sources other than said oscillatory actuation output signal to produce said feedback signal; and
(c) means operatively connecting said feedback circuit means with said drive circuit for applying said feedback signal to said drive circuit, whereby a closed-loop self-generating drive circuit is established.

17. The apparatus as recited in claim 16, wherein said drive circuit is operative to maintain the drive of said actuator/mass at its natural resonance over a range of resonant frequencies differing by at least a 10 to 1 ratio.

18. The apparatus as recited in claim 16, wherein said drive circuit is operative to maintain the drive of said actuator/mass at its natural resonance over a range of resonant frequencies differing by at least a 100 to 1 ratio.

* * * * *